(12) United States Patent
Heller et al.

(10) Patent No.: US 8,943,462 B2
(45) Date of Patent: Jan. 27, 2015

(54) TYPE INSTANCES

(71) Applicants: Jonathan Heller, Sunnyvale, CA (US); Lior Schejter, Tel Mond (IL); Inbal Zilberman Kubovsky, Ramat Gan (IL)

(72) Inventors: Jonathan Heller, Sunnyvale, CA (US); Lior Schejter, Tel Mond (IL); Inbal Zilberman Kubovsky, Ramat Gan (IL)

(73) Assignee: SAP SE, Walldorf (DE)

( * ) Notice: Subject to any disclaimer, the term of this patent is extended or adjusted under 35 U.S.C. 154(b) by 57 days.

(21) Appl. No.: 13/930,127

(22) Filed: Jun. 28, 2013

(65) Prior Publication Data

US 2015/0007125 A1    Jan. 1, 2015

(51) Int. Cl.
*G06F 9/44* (2006.01)

(52) U.S. Cl.
CPC ............... *G06F 9/4421* (2013.01); *G06F 8/20* (2013.01)
USPC .......................................... 717/100; 717/156

(58) Field of Classification Search
CPC ....................................................... G06F 8/20
USPC ................................................ 717/100, 156
See application file for complete search history.

(56) References Cited

U.S. PATENT DOCUMENTS

| | | | |
|---|---|---|---|
| 6,026,485 A * | 2/2000 | O'Connor et al. | ............ 712/226 |
| 8,060,836 B2 | 11/2011 | Duarte | |
| 8,458,647 B2 | 6/2013 | Schejter et al. | |
| 2005/0267996 A1 * | 12/2005 | O'Connor et al. | ................ 710/1 |
| 2007/0213972 A1 | 9/2007 | Schejter et al. | |
| 2007/0277021 A1 * | 11/2007 | O'Connor et al. | ............ 712/208 |
| 2009/0157812 A1 | 6/2009 | Bavly et al. | |
| 2011/0137977 A1 | 6/2011 | Nun et al. | |
| 2011/0153591 A1 | 6/2011 | Heller et al. | |
| 2011/0258594 A1 * | 10/2011 | Syme et al. | ................... 717/106 |
| 2013/0018966 A1 | 1/2013 | Kubovsky et al. | |

OTHER PUBLICATIONS

A.C.L. Rodriguez, "A Representation of Java Programs as Partial Graph Morphisms", 2003.*
Buhr et al., "Advanced Exception Handling Mechanisms", 2000.*

* cited by examiner

*Primary Examiner* — Phillip H Nguyen
(74) *Attorney, Agent, or Firm* — Fish & Richardson P.C.

(57) ABSTRACT

The present disclosure involves systems, software, and computer implemented methods for operating on type instances. One example method includes identifying a reference to a type instance during execution of a child control flow. The child control flow is associated with one or more ancestor control flows. One or more stack frames associated with the ancestor control flows are searched for a prior instantiation of the type instance. Access to the prior instantiation of the type instance in an identified stack frame associated with an identified ancestor control flow is provided in response to determining that the prior instantiation of the type instance exists in the identified stack frame. A new instance of the type instance is instantiated in a stack frame associated with the child control flow in response to determining that the prior instantiation of the type instance does not exist in the one or more stack frames.

20 Claims, 3 Drawing Sheets

TYPE INSTANCES

TECHNICAL FIELD

The present disclosure relates to computer-implemented methods, software, and systems for operating on type instances.

BACKGROUND

A run-time call stack can be used during execution of a program written in a programming language. The program can include, for example, an initial control flow, and other, internal control flows that are internal to, or nested within, the initial control flow. Each internal control flow can include one or more other internal control flows. That is, the initial control flow and an internal control flow can each call one or more other internal control flows. When an internal control flow is called, a memory stack frame associated with the internal control flow can be added to (e.g., "pushed onto") the run-time call stack. The memory stack frame can be used, for example, to store parameter information that is passed between the calling control flow and the called control flow. The memory stack frame can also be used to store local variables used within the called control flow. When execution of the called internal control flow completes, the memory stack frame associated with the called internal control flow can be removed from (e.g., "popped off") the run-time call stack.

SUMMARY

The present disclosure involves systems, software, and computer implemented methods for operating on type instances. One example method includes identifying a reference to a type instance during execution of a first child control flow in a process, wherein the first child control flow is associated with one or more ancestor control flows. One or more ancestor memory stack frames associated with the one or more ancestor control flows are searched for a prior instantiation of the type instance. Access is provided to the prior instantiation of the type instance in an identified ancestor memory stack frame associated with an identified ancestor control flow in response to determining that the prior instantiation of the type instance exists in the identified ancestor memory stack frame. A new instance of the type instance is instantiated in a memory stack frame associated with the first child control flow for use during execution of the first child control flow in the process in response to determining that the prior instantiation of the type instance does not exist in the one or more ancestor memory stack frames While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
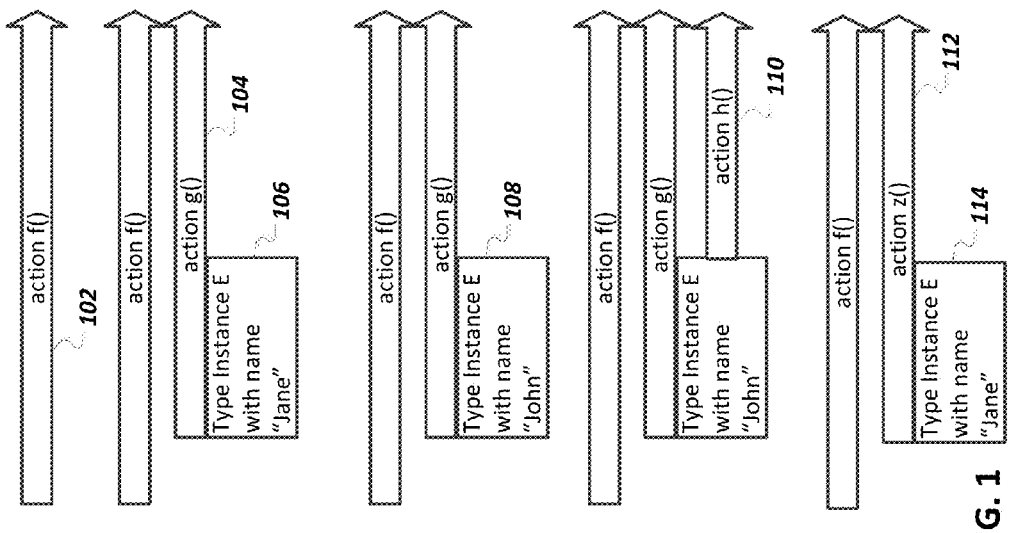
FIG. 1 illustrates an example code portion that operates on type instances.

A computer application can be designed to process multiple, concurrent requests and to be scalable to handle a different (e.g., larger) number of requests over time. A scalable design for multiple, concurrent requests can allow the application to manage peak loads and can allow system administrators to incrementally add capacity without replacing underlying hardware. A scalable design can be particularly important in a cloud computing environment.

Some programming language features, such as global variables or class-static variables, can be convenient for programmers to share state across multiple functions, modules, files, or classes, but such features might not be suitable for scalable environments. For example, an implementation of features such as global variables or class-static variables can be configured to assume that the application shares a same, common memory space. In scalable, cloud computing, however, multiple server nodes can be used, where each server node has its own memory space.

To handle separate memory spaces on multiple nodes, a design pattern can be used where server application logic is designed to be stateless. As another example, stored state can be restrict to a database or a shared in-memory cache that is accessed using remote protocols over a network. When using the design pattern, the shared state can be read from the shared storage (e.g., database or cache). However, to handle multi-threaded operations, synchronization code can be needed to avoid data inconsistency.

Also, request-specific information can be passed as one or more parameters throughout a call stack from one control flow to a next control flow. Passing and using multiple parameters can be cumbersome for developers because a parameter list for each function can become long (e.g., several, ten, or more parameters), which can result in a performance degradation due to the passing and storing of the multiple parameters. Parameters can be passed multiple times even though some or all of the parameters may only be directly used by one or a small subset of the functions which pass or accept the parameter. In some cases, a parameter can be passed in consideration that at some point, a called function may potentially use the parameter, even if the current version of the function does not use the parameter. Functions which pass or accept multiple parameters can be difficult for a programmer to read and understand, which can affect not just readability but also maintainability of the code.

An approach to providing a scalable design for sharing state which does not rely on global variables, class-static variables, or parameter passing can be used. For example, a programming language can be designed to support a feature which can be referred to as a type instance. A type instance can be associated, for example, with an entity, class, structure, or some other type. A type instance can be an instance of a class that is accessible syntactically using the type name followed by an action name or element name defined by the type.

The type instance feature can be implemented such that, during execution of an application, an instantiation of the type instance is created in a memory stack frame of a function (e.g., action, method) when a reference to the type instance is first encountered during execution of the process. The created instance of the type instance can be used in the function and in any other functions called directly or indirectly by the function. When the function ends, the memory stack frame, including the created type instance, is cleared from memory. Consequently, for example, the caller of the function does not have access to the instance of the type instance. If the function is called multiple times (e.g., in multiple, separate threads), each invocation of the function can result in a separate creation of the type instance. Type instances are thread-safe, and can be used as a scalable shared memory space, in the processing of multiple, concurrent requests in an application. A programmer can use a type instance in a function and can know that the current thread in the function in which the type instance is first used, as well as any other function that is called directly or indirectly from the function, can each have access to the type instance. The programmer does not need to write specific multi-thread synchronizing code.

FIG. 1 illustrates an example code portion 100 that operates using type instances. Lines 1 to 21 of the code portion 100 define an entity "E". As shown on lines 2 to 4 of the code portion 100, the entity "E" has three elements (e.g., properties), namely "name", "calcName", and "anotherCalcName", respectively. actions "f( )", "g( )", "h( )", and "z( )" of the entity "E" are defined on lines 5 to 9, 11 to 14, 15 to 17, and 18 to 20, respectively.

A "main" control flow is defined on lines 23 to 26 of the code portion 100. At line 24 of the code portion 100, an instance of the entity "E" is created with a name of "e". At line 25 of the code portion 100, the action "f( )" is called on the created instance of the entity E. An arrow 102 (and other, similar arrows also having a label of "action f( )") represents execution of the action "f( )".

During execution of the action "f( )", the action "g( )" is called (e.g., at line 6 of the code portion 100). An arrow 104 represents execution of the action "g( )". On line 12 of the code portion 100, within the execution of the action "g( )", a type instance reference "E.name" is on the left side of an assignment statement. A type instance reference can syntactically include, for example, from left to right, an entity name (e.g., "E"), a period, and a name of an element of the entity (e.g., "name", "calcName"). Any name of a particular element of the entity can initially be used to instantiate a new type instance and/or access a prior instantiated type instance.

During execution of the action "g( )", when the type instance reference on line 12 is identified, one or more memory stack frames associated with the caller of action "g( )" (i.e., the action "f( )"), or with some other ancestor control flow of the action "g( )", are searched to determine whether a prior instantiation of the type instance exists in any of the searched memory stack frames. The one or more memory stack frames can be searched in an order from youngest to oldest, starting with a memory stack frame associated with the caller (e.g. parent) of the action "g( )" (i.e., the action "f( )"). In some implementations, the "main" control flow is also searched (e.g., "main" can be considered a parent control flow of the action "f( )"). That is, in some implementations, parent control flows that are outside the scope of an entity may be searched for prior instantiations of a type instance for the entity. In some implementations, whether an external control flow that is outside the scope of the entity is searched depends on an access qualifier of the element that is included in the identified type instance reference. For example, in some implementations, if an access qualifier is "public", then the external control flow may be searched, and if the access qualifier is "private" (or if a default, unspecified access qualifier is "private") then the external control flow might not be searched, since the external control flow would not be allowed to include a reference to the private element of the entity. In some implementations, external control flows are not searched, regardless of the access qualifier of the element included in the identified type instance reference.

In an implementation where an external control flow may be searched, if an instantiation of the type instance is not found in the memory stack frame associated with the action "f( )", a memory stack frame associated with the "main" control flow can be searched. In the example of the code portion 100, there are no instantiations of the type instance in either the action "f( )" or the action "main( )". In general, if no prior instantiations of the type instance are found in the call stack after a type instance reference is identified, a new instance of the type instance can be instantiated. The new instance can be stored in a memory stack frame associated with the control flow (e.g., action) that includes the identified type instance reference. For example, a memory stack frame 106 associated with the action "g( )" includes a type instance "E" with a name element having a value of "Jane". The name element can be initialized to the value of "Jane", for example, based on the initialization statement associated with the name element on line 2 of the code portion 100.

After the type instance is instantiated in the memory stack frame 106, execution of line 12 of the code portion 100 continues, which results in an assignment of the value "John" to the name element of the instantiated type instance. For example, as illustrated by a memory stack frame 108, the name element of the instantiated type instance "E" included in the memory stack frame associated with the action "g( )" has been set to a value of "John", based on the assignment statement of line 12 of the code portion 100.

At line 13 of the code portion 100, the action "h( )" is called. An arrow 110 represents execution of the action "h( )". At line 16 of the code portion 100 (e.g., inside of the action "h( )"), the calcName element of the "e" instance (e.g., the "e" instance created as a result of executing line 25 of the code portion 100) is assigned a value resulting from a concatenation operation. The left side of the concatenation operation is a type instance reference of "E.name". In response to identifying the type instance reference on line 16 of the code portion 100, the memory stack frame associated with the action "g( )" is searched for a prior instantiation of the type instance. A type instance for the entity "E" is identified in the memory stack frame associated with the action "g( )" and access to the identified type instance (e.g., access to the memory space occupied by the type instance) is provided for execution of line 16 of the code portion 100. For example, a value of "John" can be accessed and the value "John" can be used in the concatenation operation on line 16 of the code portion 100. After line 16 of the code portion 100 is executed, the "calcName" element of the "e" instance has a value of "John Doe".

Continuing with the execution of the code portion 100, execution of the action "h( )" finishes on line 17. Control returns to line 14 of the code portion 100 (e.g., the last line of the action "g( )"), and execution of the action "g( )" finishes. When execution of the action "g( )" finishes, the contents of the memory stack frame 108 associated with the action "g( )" (e.g., including the type instance for the entity "E") are cleared from memory.

When the execution of the action "g( )" finishes, control is returned to the action "f( )" at line seven of the code portion 100, and at line seven, the action "z( )" is called. An arrow 112 represents execution of the action "z( )". At line 19 of the code portion 100 (e.g., inside of the action "z( )"), an "E.name" type instance reference is identified. The ancestor control flows of the action "z( )" (e.g., the actions "f( )" and "main") can be searched for a prior instantiation of a type instance for the "E" entity. In the example of the code portion 100, no prior instantiation exists in any memory stack frame associated with an ancestor control flow of the action "z( )". Note that the contents of the memory stack frame associated with the action "g( )" (e.g., the memory stack frame 108) have been cleared from memory by the time the action "z( )" is executed. The actions "g( )" and "z( )" are sibling control flows. Descendent control flows of the action g( ) (e.g., the action "h( )") have access to type instances instantiated within the action "g( )", but a control flow that is a sibling to the action "g( )" (e.g., the action "z( )") does not have access to a type instance instantiated in the action "g( )".

Since the search performed in response to identifying the type instance reference on line 19 does not identify a prior instantiation of the type instance, a new type instance is instantiated and is stored in a memory stack frame associated with the action "z( )" (e.g., a memory stack frame 114). The memory stack frame 114 includes a type instance for the entity "E" with a name element initialized to a value of "Jane". The value of "Jane" is used in the concatenation operation included in line 19 of the code portion 100, and a result of the execution of line 19 is the anotherCalcName element of the "e" instance being set to a value of "Doe, Jane".

Figure 2:
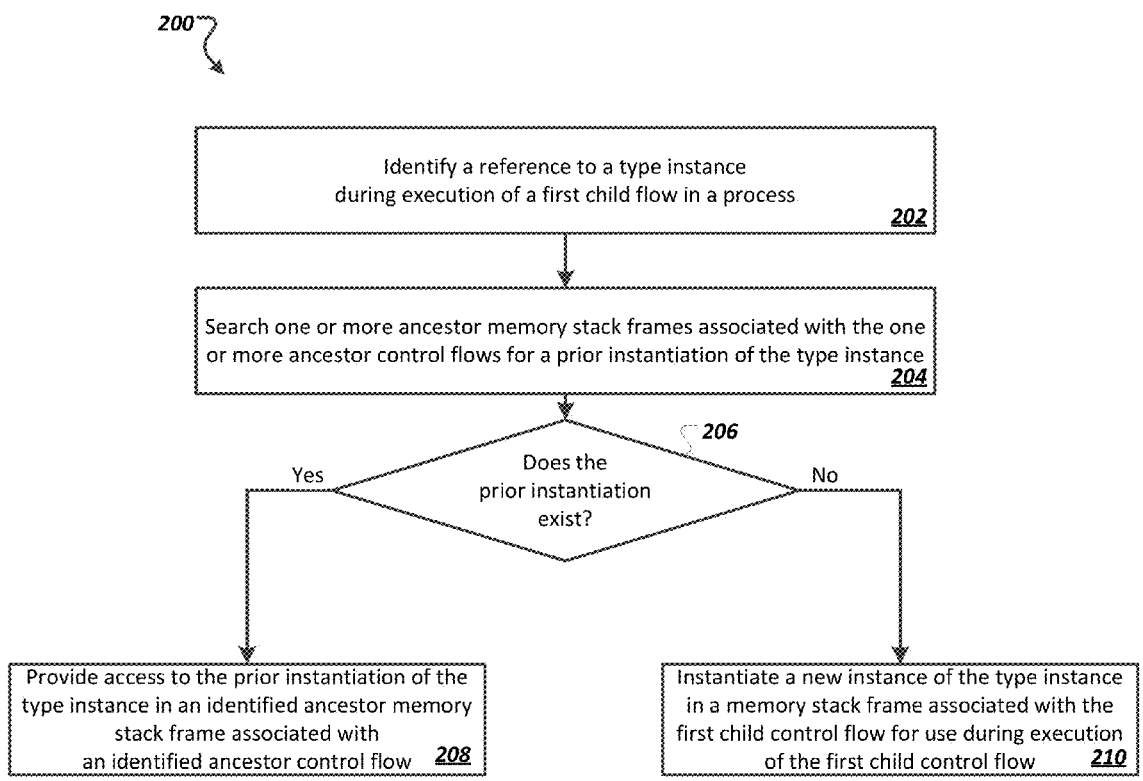
FIG. 2 is a flowchart of an example method for providing access to a type instance.

FIG. 2 is a flowchart of an example method 200 for providing access to a type instance. It will be understood that method 200 and related methods may be performed, for example, by any suitable system, environment, software, and hardware, or a combination of systems, environments, software, and hardware, as appropriate. For example, one or more of a client, a server, or other computing device can be used to execute method 200 and related methods and obtain any data from the memory of a client, the server, or the other computing device. In some implementations, the method 200 and related methods are executed by the system 300 described below with respect to FIG. 3.

At 202, a reference to a type instance is identified during execution of a first child control flow in a process, wherein the first child control flow is associated with one or more ancestor control flows. A type instance reference can be, for example, an identifier which includes, from left to right, an entity name, a period, and a name of an element or an action of the entity. "Entity" can refer to a class, structure, object definition, etc. The first child control flow can be an action, a method, a function, a procedure, a sub-routine, a member, or some other type of control flow. The type instance reference can be identified, for example, when a compiler identifies a machine-code representation of the type instance reference or when an interpreter identifies a source code identifier as a type instance reference. Ancestor control flows can include, for example, the caller (e.g., parent) of the first child control flow, the caller of the parent, etc.

Multiple instances can be identified within the first child control flow. The multiple instances can include two or more identical identifiers (e.g., two instances both referring to the same entity and the same element of that entity). The multiple instances can include two or more instances which each refer to the same entity but which refer to different elements or actions of the same entity. The multiple instances can include two or more instances which each refer to a different entity.

At 204, one or more ancestor memory stack frames associated with the one or more ancestor control flows are searched for a prior instantiation of the type instance. For example, the one or more ancestor memory stack frames can be searched in an order from youngest to oldest, starting with a memory stack frame associated with the parent of the first child control flow. Searching can stop, for example, when the prior instantiation is found or when an oldest (e.g., bottom-most in a call stack) ancestor memory stack frame is searched without finding the prior instantiation.

At 206, a determination is made as to whether the prior instantiation exists in the one or more ancestor memory stack frames. For example, if the oldest ancestor memory stack frame has been searched without finding the prior instantiation, a determination can be made that the prior instantiation does not exist in the one or more memory stack frames. As another example, if the prior instantiation is found in an ancestor memory stack frame, a determination can be made that the prior instantiation exists in the one or more ancestor memory stack frames.

If the prior instantiation of the type instance exists in an identified ancestor memory stack frame associated with an identified ancestor control flow, access is provided, at 208, to the prior instantiation of the type instance in the identified ancestor memory stack frame. For example, access to the memory space in the identified ancestor memory stack frame occupied by the prior instantiation of the type instance can be provided for execution of the first child control flow. Code associated with the first child control flow can, for example, read and/or set one or more values (e.g., element values) of or call one or more actions of the prior instantiation of the type instance. Access to the prior instantiation of the type instance can be limited to use within first child control flow, the identified ancestor control flow, and other descendants of the identified ancestor control flow.

If the prior instantiation of the type instance does not exist in the one or more ancestor memory stack frames, a new instance of the type instance is instantiated, at 210, in a memory stack frame associated with the first child control flow for use during execution of the first child control flow in the process. For example, a memory area can be identified or created in the memory stack frame associated with the first child control flow, where the memory area can be or can refer to, for example, an area equal in size to the sum of the size of the elements defined in the entity associated with the type instance.

The lifecycle of the new type instance can be managed by a runtime framework executing the first child control flow. For example, the runtime framework can limit the use of the new instance of the type instance to use within the first child control flow. When the first child control flow completes execution, the memory stack frame associated with the first child control flow can be deleted, which can include the deletion or clearing of memory associated with the new instance.

If the first child control flow includes one or more internal child control flows, the new instance of the type instance can be available for use to the one or more internal child control flows. The new instance of the type instance can be configured to not be accessible to a sibling control flow that is a sibling of the first child control flow. The first child control flow and the sibling child control flow can each have access to prior instantiations of the type instance instantiated in a common ancestor control flow, but the first child control flow and the sibling child control flow do not have access to type instances instantiated in the other sibling control flow.

Figure 3:
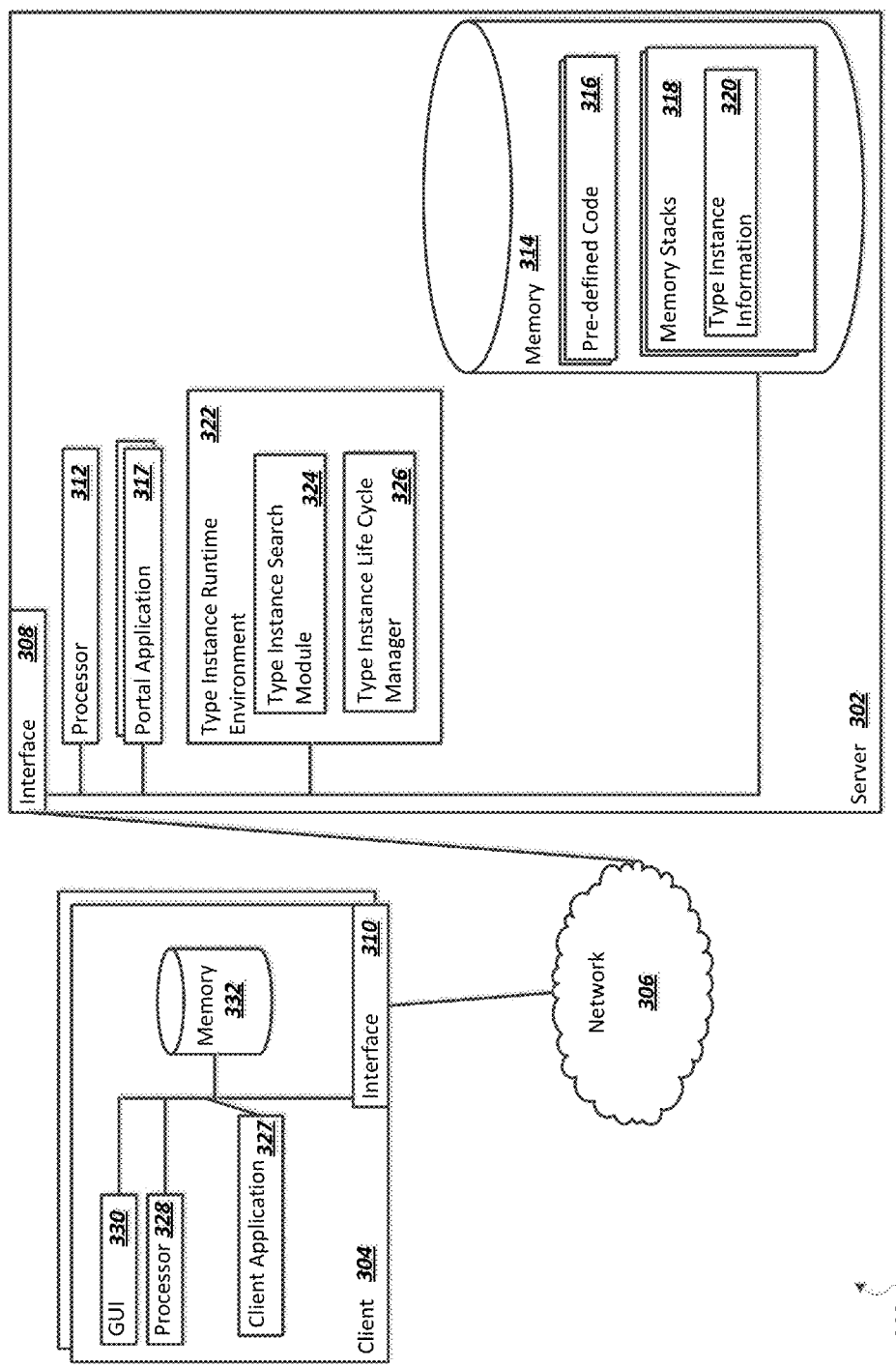
FIG. 3 is a block diagram illustrating an example system for operating on type instances.

FIG. 3 is a block diagram illustrating an example system 300 for operating on type instances. Specifically, the illustrated system 300 includes or is communicably coupled with a server 302, a client device 304, and a network 306. Although shown separately, in some implementations, functionality of two or more systems or servers may be provided by a single system or server.

As used in the present disclosure, the term "computer" is intended to encompass any suitable processing device. For example, although FIG. 3 illustrates a single server 302 and a single client 304, the system 300 can be implemented using a single, stand-alone computing device, two or more servers 302, or two or more clients 304. Indeed, the server 302 and the client device 304 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 302 and the client device 304 may be adapted to execute any operating system, including Linux, UNIX, Windows, Mac OS®, Java™, Android™, iOS or any other suitable operating system. According to one implementation, the server 302 may also include or be communicably coupled with an e-mail server, a Web server, a caching server, a streaming data server, and/or other suitable server.

Interfaces 308 and 310 are used by the server 302 and the client device 304, respectively, for communicating with other systems in a distributed environment—including within the system 300—connected to the network 306. Generally, the interfaces 308 and 310 each comprise logic encoded in software and/or hardware in a suitable combination and operable to communicate with the network 306. More specifically, the interfaces 308 and 310 may each comprise software supporting one or more communication protocols associated with communications such that the network 306 or interface's hardware is operable to communicate physical signals within and outside of the illustrated system 300.

The server 302 includes one or more processors 312. Each processor 312 may be a central processing unit (CPU), a blade, an application specific integrated circuit (ASIC), a field-programmable gate array (FPGA), or another suitable component. Generally, each processor 312 executes instructions and manipulates data to perform the operations of the server 302. Specifically, each processor 312 executes the functionality required to receive and respond to requests from the client device 304, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 3 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 302 includes memory 314. In some implementations, the server 302 includes multiple memories. The memory 314 includes one or more instances of pre-defined code 316 (e.g., program code under execution). The pre-defined code may implement one or more features of a portal application 317. The pre-defined code 316 may include, for example, multiple control flows, with some control flows including one or more nested control flows. The pre-defined code 316 may include one or more type instance references. The memory 314 includes one or more memory stacks 318 which each include one or more memory stack frames for associated control flows being executed. Some or all of the memory stack frames may include type instance information 320. The memory 314 may include any type of memory or database module and may take the form of volatile and/or non-volatile memory including, without limitation, magnetic media, optical media, random access memory (RAM), read-only memory (ROM), removable media, or any other suitable local or remote memory component. The memory 314 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 302.

The server 302 includes a type instance runtime environment 322, which manages execution of the pre-defined code 316, including the sharing of type instances across control flows. A type instance search module 324 searches a memory stack 318 for prior instantiations of a type instance in response to a reference to the type instance being identified during execution of the pre-defined code 316. A type instance life cycle manager 326 manages the life time of type instances, including the deletion of a memory stack frame included in the memory stack 318 and corresponding type instance information 320 when a particular control flow completes execution.

The client device 304 may generally be any computing device operable to connect to or communicate with the server 302 via the network 306 using a wireline or wireless connection. In general, the client device 304 comprises an electronic computer device operable to receive, transmit, process, and store any appropriate data associated with the system 300 of FIG. 3. The client device 304 can include one or more client applications, including an application 327. A client application 327 is any type of application that allows the client device 304 to request and view content on the client device 304. In some implementations, a client application 327 can use parameters, metadata, and other information received at launch to access a particular set of data from the server 302. In some instances, a client application may be an agent or client-side version of the one or more enterprise applications 317 running on the server 302.

The client application 327 may submit a request to the enterprise application 317, which may result in execution of a portion of the pre-defined code 316 which includes one or more operations that use one or more type instances. Although illustrated as being included in the server 304, in some implementations, the type instance runtime environment 322 and the pre-defined code 316 can be downloaded to the client device 304, for execution of the pre-defined code 316 by the type instance runtime environment 322.

The client device 304 further includes one or more processors 328. Each processor 328 included in the client device 304 may be a central processing unit (CPU), an application specific integrated circuit (ASIC), a field-programmable gate array (FPGA), or another suitable component. Generally, each processor 328 included in the client device 304 executes instructions and manipulates data to perform the operations of the client device 304. Specifically, each processor 328 included in the client device 304 executes the functionality required to send requests to the server 302 and to receive and process responses from the server 302.

The client device 304 is generally intended to encompass any client computing device such as a laptop/notebook computer, wireless data port, smart phone, personal data assistant (PDA), tablet computing device, one or more processors within these devices, or any other suitable processing device. For example, the client device 304 may comprise a computer that includes an input device, such as a keypad, touch screen, or other device that can accept user information, and an output device that conveys information associated with the operation of the server 302, or the client device 304 itself, including digital data, visual information, or a graphical user interface 330.

The GUI 330 of the client device 304 interfaces with at least a portion of the system 300 for any suitable purpose, including generating a visual representation of the client application 327. In particular, the GUI 330 may be used to view and navigate various Web pages. Generally, the GUI 330 provides the user with an efficient and user-friendly presentation of business data provided by or communicated within the system. The GUI 330 may comprise a plurality of customizable frames or views having interactive fields, pull-down lists, and buttons operated by the user. The GUI 330 contemplates any suitable graphical user interface, such as a combination of a generic web browser, intelligent engine, and command line interface (CLI) that processes information and efficiently presents the results to the user visually.

Memory 332 included in the client device 304 may include any memory or database module and may take the form of volatile or non-volatile memory including, without limitation, magnetic media, optical media, random access memory (RAM), read-only memory (ROM), removable media, or any other suitable local or remote memory component. The memory 332 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 304. In implementations where the pre-defined code 316 is downloaded to and executed on the client device 304, the memory 332 can include the pre-defined code 316 and the memory stacks 318.

There may be any number of client devices 304 associated with, or external to, the system 300. For example, while the illustrated system 300 includes one client device 304, alternative implementations of the system 300 may include multiple client devices 304 communicably coupled to the server 302 and/or the network 306, or any other number suitable to the purposes of the system 300. Additionally, there may also be one or more additional client devices 304 external to the illustrated portion of system 300 that are capable of interacting with the system 300 via the network 306. Further, the term "client", "client device" and "user" may be used interchangeably as appropriate without departing from the scope of this disclosure. Moreover, while the client device 304 is described in terms of being used by a single user, this disclosure contemplates that many users may use one computer, or that one user may use multiple computers.

The preceding figures and accompanying description illustrate example processes and computer-implementable techniques. But system 300 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 300 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method comprising:
    identifying a reference to a type instance during execution of a first child control flow in a process, wherein the first child control flow is associated with one or more ancestor control flows;
    searching one or more ancestor memory stack frames associated with the one or more ancestor control flows for a prior instantiation of the type instance;
    providing access to the prior instantiation of the type instance in an identified ancestor memory stack frame associated with an identified ancestor control flow in response to determining that the prior instantiation of the type instance exists in the identified ancestor memory stack frame; and
    instantiating a new instance of the type instance in a memory stack frame associated with the first child control flow for use during execution of the first child control flow in the process in response to determining that the prior instantiation of the type instance does not exist in the one or more ancestor memory stack frames.

2. The method of claim 1, wherein use of the new instance of the type instance is limited to use within the first child control flow.

3. The method of claim 2, wherein the first child control flow includes one or more internal child control flows, and wherein the new instance of the type instance is available for use to the one or more internal child control flows.

4. The method of claim 2, wherein a lifecycle of a particular new type instance is managed by a runtime framework executing the first child control flow.

5. The method of claim 1, further comprising deleting the memory stack frame associated with the first child control flow in response to the first child control flow completing execution.

6. The method of claim 1, wherein providing access to the prior instantiation of the type instance in the identified ancestor memory stack frame comprises providing access to memory space in the identified ancestor memory stack frame occupied by the prior instantiation of the type instance.

7. The method of claim 1, wherein the first child control flow includes two or more instantiated type instance references.

8. The method of claim 1, wherein the one or more ancestor memory stack frames are searched in an order from youngest to oldest, starting with starting with a memory stack frame associated with the parent of the first child control flow.

9. The method of claim 1, wherein a type instance comprises a regular instance of a class accessible syntactically using the name of the class.

10. The method of claim 1, wherein the prior instantiation of the type instance is limited to use within the identified ancestor control flow and descendants of the identified ancestor control flow.

11. The method of claim 1, wherein the new instance of the type instance is not accessible to a sibling control flow that is a sibling of the first child control flow.

12. A system comprising:
one or more computers associated with an enterprise portal; and
a computer-readable medium coupled to the one or more computers having instructions stored thereon which, when executed by the one or more computers, cause the one or more computers to perform operations comprising:
identifying a reference to a type instance during execution of a first child control flow in a process, wherein the first child control flow is associated with one or more ancestor control flows;
searching one or more ancestor memory stack frames associated with the one or more ancestor control flows for a prior instantiation of the type instance;
providing access to the prior instantiation of the type instance in an identified ancestor memory stack frame associated with an identified ancestor control flow in response to determining that the prior instantiation of the type instance exists in the identified ancestor memory stack frame; and
instantiating a new instance of the type instance in a memory stack frame associated with the first child control flow for use during execution of the first child control flow in the process in response to determining that the prior instantiation of the type instance does not exist in the one or more ancestor memory stack frames.

13. The system of claim 12 wherein use of the new instance of the type instance is limited to use within the first child control flow.

14. The system of claim 13, wherein the first child control flow includes one or more internal child control flows, and wherein the new instance of the type instance is available for use to the one or more internal child control flows.

15. The system of claim 13, wherein a lifecycle of a particular new type instance is managed by a runtime framework executing the first child control flow.

16. The system of claim 12, further comprising deleting the memory stack frame associated with the first child control flow in response to the first child control flow completing execution.

17. A computer program product encoded on a non-transitory storage medium, the product comprising non-transitory, computer readable instructions for causing one or more processors to perform operations comprising:
identifying a reference to a type instance during execution of a first child control flow in a process, wherein the first child control flow is associated with one or more ancestor control flows;
searching one or more ancestor memory stack frames associated with the one or more ancestor control flows for a prior instantiation of the type instance;
providing access to the prior instantiation of the type instance in an identified ancestor memory stack frame associated with an identified ancestor control flow in response to determining that the prior instantiation of the type instance exists in the identified ancestor memory stack frame; and
instantiating a new instance of the type instance in a memory stack frame associated with the first child control flow for use during execution of the first child control flow in the process in response to determining that the prior instantiation of the type instance does not exist in the one or more ancestor memory stack frames.

18. The product of claim 17 wherein use of the new instance of the type instance is limited to use within the first child control flow.

19. The product of claim 18, wherein the first child control flow includes one or more internal child control flows, and wherein the new instance of the type instance is available for use to the one or more internal child control flows.

20. The product of claim 18, wherein a lifecycle of a particular new type instance is managed by a runtime framework executing the first child control flow.

* * * * *